(12) United States Patent
Mizuta et al.

(10) Patent No.: US 12,482,213 B2
(45) Date of Patent: Nov. 25, 2025

(54) VIRTUAL SPACE PRESENTATION DEVICE

(71) Applicant: NTT DOCOMO, INC., Tokyo (JP)

(72) Inventors: Reo Mizuta, Chiyoda-ku (JP); Yasuo Morinaga, Chiyoda-ku (JP); Tatsuya Nishizaki, Chiyoda-ku (JP); Mitsuhiro Goto, Chiyoda-ku (JP); Yuki Nakamura, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 129 days.

(21) Appl. No.: 18/696,149

(22) PCT Filed: Aug. 24, 2022

(86) PCT No.: PCT/JP2022/031931
§ 371 (c)(1),
(2) Date: Mar. 27, 2024

(87) PCT Pub. No.: WO2023/053796
PCT Pub. Date: Apr. 6, 2023

(65) Prior Publication Data
US 2024/0394995 A1     Nov. 28, 2024

(30) Foreign Application Priority Data

Sep. 30, 2021   (JP) ................................ 2021-160669

(51) Int. Cl.
*G06F 3/01*     (2006.01)
*G02B 27/02*    (2006.01)
(Continued)

(52) U.S. Cl.
CPC ........... *G06T 19/20* (2013.01); *H04N 13/279* (2018.05); *G06T 2219/2016* (2013.01)

(58) Field of Classification Search
None
See application file for complete search history.

(56) References Cited

U.S. PATENT DOCUMENTS

| 10,373,342 | B1* | 8/2019 | Perez, III | ................ G06F 3/011 |
| 2007/0097116 | A1* | 5/2007 | Ito | ....................... G06F 3/04815 |
| | | | | 345/419 |

(Continued)

FOREIGN PATENT DOCUMENTS

JP          2020-127133 A          8/2020

OTHER PUBLICATIONS

International Preliminary Report on Patentability and Written Opinion issued Apr. 11, 2024 in PCT/JP2022/031931, 6 pages.

(Continued)

*Primary Examiner* — Martin Mushambo
(74) *Attorney, Agent, or Firm* — Oblon, McClelland, Maier & Neustadt, L.L.P.

(57) ABSTRACT

A virtual space presentation device includes a virtual space generation unit generating a virtual space including a virtual viewpoint of a user inside to allocate a content into the virtual space, a display control unit displaying the virtual space on a display unit, a detection unit detecting an action of the user, a virtual space correction unit moving the virtual viewpoint to correct the virtual space, and a display correction unit displaying the corrected virtual space on the display unit. The virtual space correction unit computes a display magnification on the basis of the virtual viewpoint, a first size applied to the content in a case where the virtual viewpoint is positioned at the center of the virtual space, and a second size different from the first size, and allocates the content to which a size according to the computed display magnification is applied to the corrected virtual space.

11 Claims, 8 Drawing Sheets

(51) Int. Cl.
*G06T 19/20* (2011.01)
*H04N 13/279* (2018.01)

(56) References Cited

U.S. PATENT DOCUMENTS

2018/0247453 A1* 8/2018 Nakashima .............. G09G 5/00
2019/0026005 A1* 1/2019 Lee ....................... G06T 15/205
2019/0385368 A1* 12/2019 Cartwright ........... H04N 13/156
2021/0223558 A1* 7/2021 Kake ........................ G06F 3/01
2022/0036624 A1* 2/2022 Kondoh .................. G06T 13/20

OTHER PUBLICATIONS

International Search Report mailed on Nov. 15, 2022 in PCT/JP2022/031931 filed on Aug. 24, 2022, 2 pages.

* cited by examiner

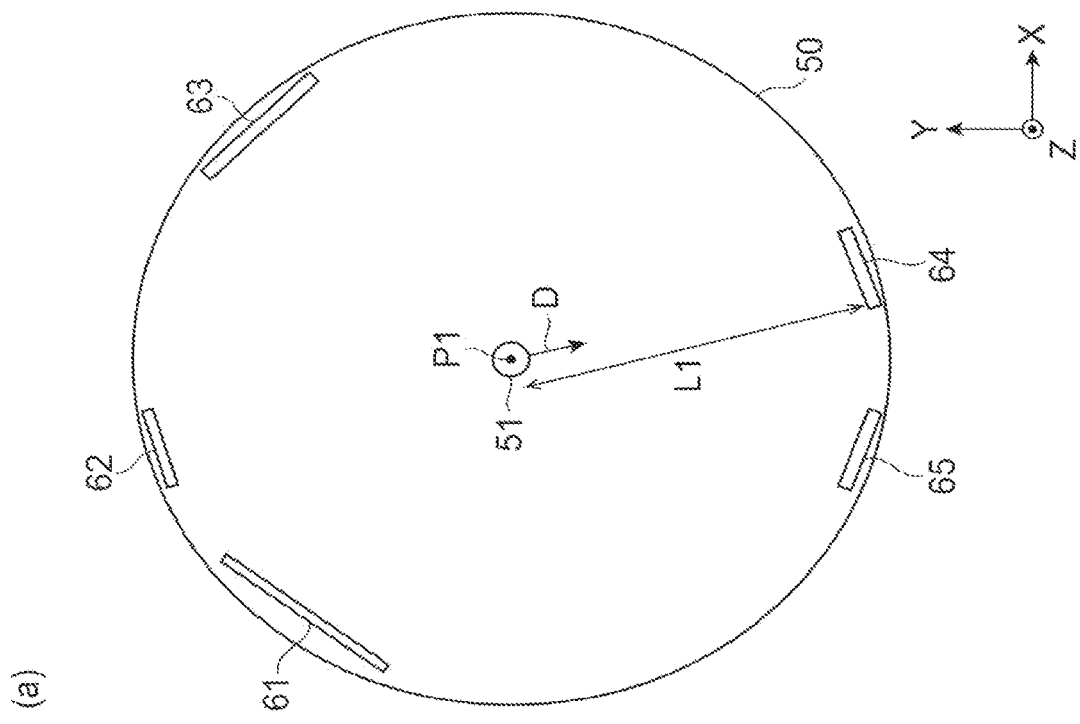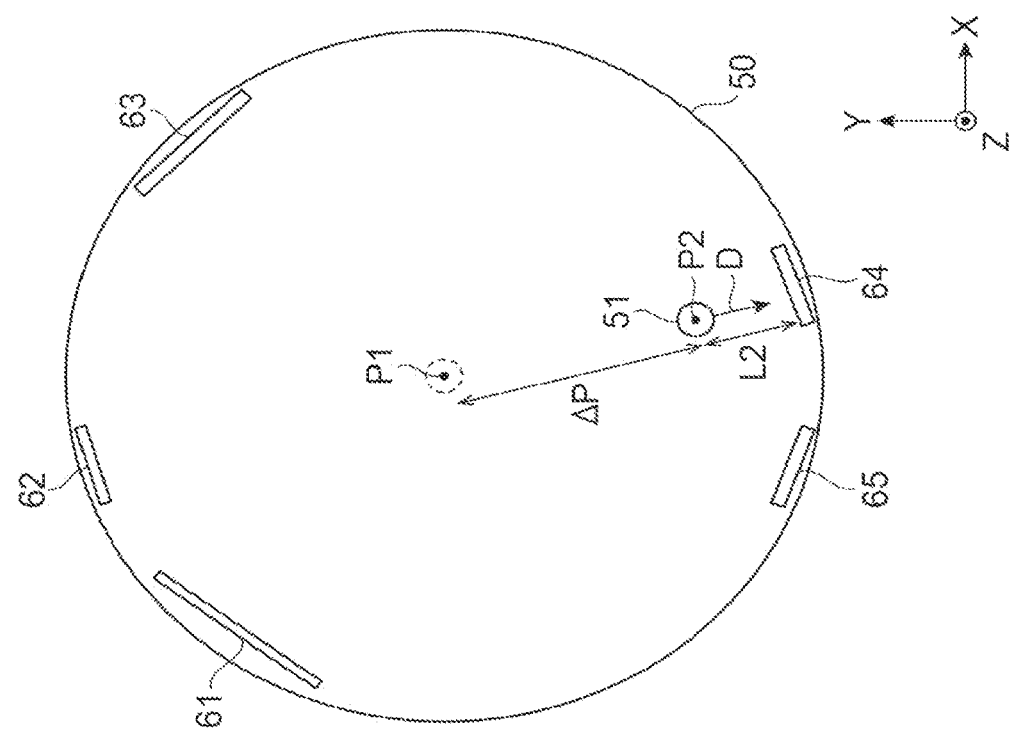
Fig. 4

Fig.6

| ID | CONTENT DATA | FIRST SIZE | SECOND SIZE | MODE | |
|---|---|---|---|---|---|
| 61 | SCHEDULE | 240×360 | — | APPROACH | ... |
| 62 | PICTURE IMAGE | 192×108 | 1920×1080 | APPROACH | ... |
| 63 | APPLICATION | 50×50 | — | APPROACH | ... |
| 64 | CAR (3D DATA) | 90×36×30 (cm) | 450×180×150 (cm) | ACTUAL SIZE | ... |
| 65 | WATCH (3D DATA) | 50×50×50 (cm) | 5×5×5 (cm) | ACTUAL SIZE | ... |
| ... | ... | ... | ... | ... | ... |

VIRTUAL SPACE PRESENTATION DEVICE

TECHNICAL FIELD

One aspect of the present invention relates to a virtual space presentation device.

BACKGROUND ART

Patent Literature 1 discloses a display device that displays an enlarged region that a viewer is watching, in a VR video projected on a spherical video projection surface centered on the capturing viewpoint of the VR video. More specifically, Patent Literature 1 discloses the display device displaying a display video cut out from the projected VR video in a display region (a region that can be visually recognized by the viewer) to display an enlarged watched video corresponding to a watched region (a part of the display region) that the viewer is watching in the display region.

CITATION LIST

Patent Literature

Patent Literature 1: Japanese Unexamined Patent Publication No. 2020-127133

SUMMARY OF INVENTION

Technical Problem

As a type of virtual space, a technology of allocating various contents (for example, a still image, a moving image, a browser screen, a screen of a predetermined application, and the like) centered on the virtual viewpoint of a user to a projection surface has been studied. However, a suitable size for each of the contents can be different for each of the contents. Accordingly, for example, in a case where the entire virtual space is uniformly enlarged or reduced, all the contents are similarly enlarged or reduced without considering a difference in the definition between different contents, or the like. Further, in a method for enlarging a part of the video as in Patent Literature 1, it is not possible to display all the contents in a suitable size.

Therefore, an object of one aspect of the present invention is to provide a virtual space presentation device capable of displaying a content in a virtual space in a suitable size.

Solution to Problem

A virtual space presentation device according to one aspect of the present invention includes: a virtual space generation unit generating a virtual space including a virtual viewpoint of a user inside to allocate a content into the virtual space; a display control unit displaying the virtual space on a display unit; a detection unit detecting an action of the user set in advance to determine a movement amount of the virtual viewpoint according to the action; a virtual space correction unit moving the virtual viewpoint in the virtual space on the basis of the movement amount of the virtual viewpoint determined by the detection unit to correct the virtual space to a state seen from the moved virtual viewpoint; and a display correction unit displaying the corrected virtual space on the display unit. A first size applied to the content when the virtual viewpoint is positioned at the center of the virtual space, and a second size different from the first size are associated with the content. The virtual space correction unit computes a display magnification of the content on the basis of the moved virtual viewpoint, and the first size and the second size associated with the content, and allocates the content to which a size according to the computed display magnification is applied to the corrected virtual space.

In the virtual space presentation device according to one aspect of the present invention, the virtual space to which the content is allocated is presented to the user. Then, in a case where the movement amount of the virtual viewpoint according to the action of a predetermined user is determined, the corrected virtual space seen from the moved virtual viewpoint is presented to the user. The content to which the size according to the display magnification determined for each of the contents on the basis of the moved virtual viewpoint, and the first size and the second size associated with the content is applied is allocated to the corrected virtual space. According to the virtual space presentation device described above, the appearance of each of the contents is changed in accordance with the virtual viewpoint, and the first size and the second size associated with the content. Accordingly, the user is capable of adjusting the content to a desired appearance on the corrected virtual space. As a result thereof, it is possible to display the content in the virtual space in a suitable size.

Advantageous Effects of Invention

According to one aspect of the present invention, it is possible to provide the virtual space presentation device capable of displaying the content in the virtual space in the suitable size.

BRIEF DESCRIPTION OF DRAWINGS

FIG. 4 is a diagram schematically illustrating an example of a movement of a virtual viewpoint.

FIG. 6 is a diagram illustrating an example of virtual space information.

DESCRIPTION OF EMBODIMENTS

Figure 1:
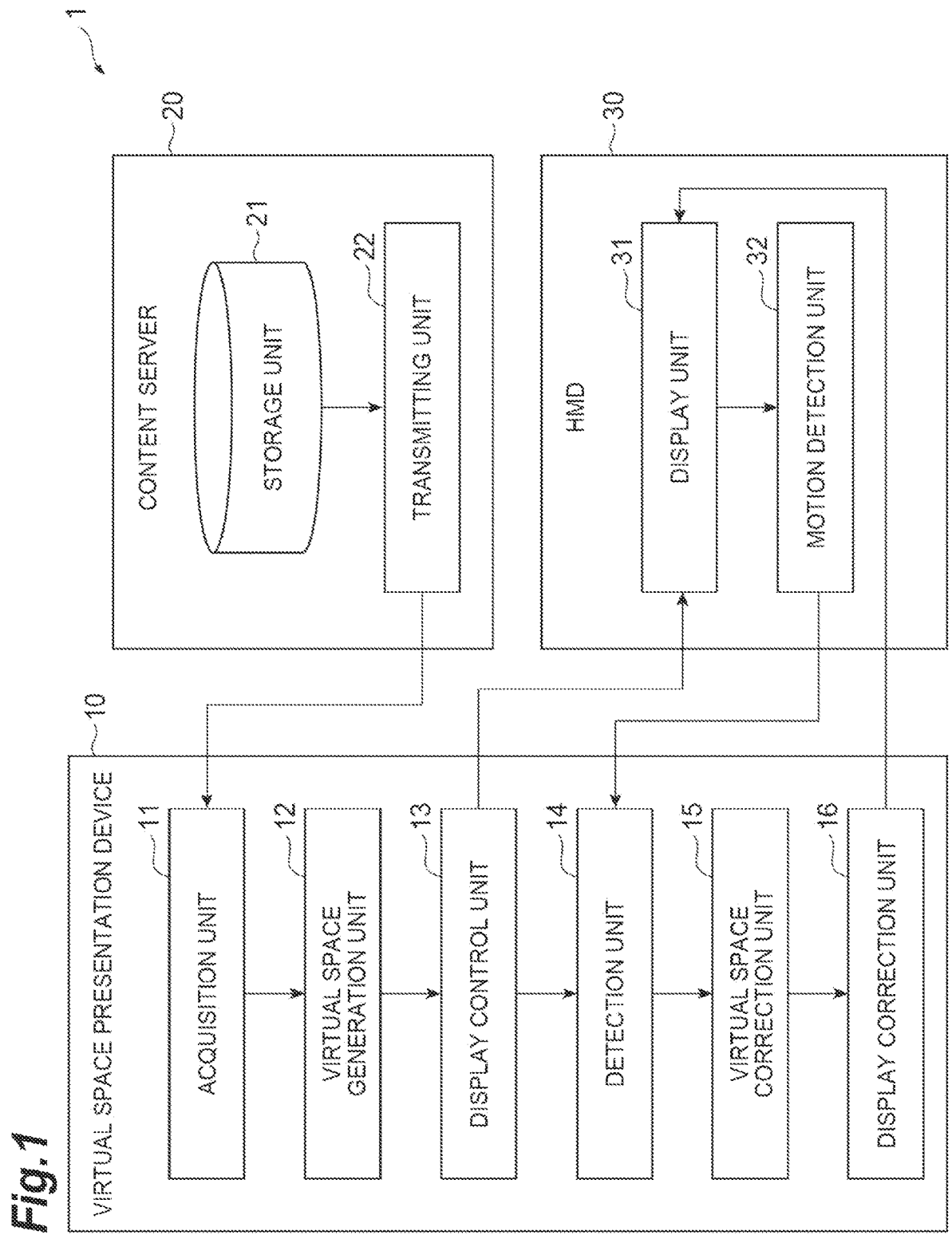
FIG. 1 is a diagram illustrating an example of a function configuration of a virtual space presentation system according to one embodiment.

Hereinafter, one embodiment of the present invention will be described in detail with reference to the attached drawings. Note that, in the description of the drawings, the same reference numerals will be applied to the same or corresponding elements, and the repeated description will be omitted.

FIG. 1 is a diagram illustrating an example of a virtual space presentation system 1 according to one embodiment. The virtual space presentation system 1 is a computer system presenting a virtual space to a user. As an example, the virtual space presentation system 1 includes a virtual space presentation device 10, a content server 20, and a head mounted display (HMD) 30. The virtual space presentation device 10 is connected to the content server 20 and the HMD 30 in a wired or wireless manner such that communication is available.

In the virtual space presentation system 1, the virtual space presentation device 10 acquires virtual space information required to generate the virtual space (such as information indicating the contents and the position of a content to be allocated to the virtual space) from the content server 20. The virtual space presentation device 10 generates the virtual space on the basis of the virtual space information, and displays the virtual space on the HMD 30 mounted on the head of the user. The user is capable of visually recognizing the virtual space via the HMD 30. Note that, the virtual space presentation device 10 may display the same virtual space on the HMD 30 mounted on the head of each of a plurality of users. In this case, each of the users is capable of sharing the same virtual space with other users via the HMD 30.

The virtual space presentation device 10 is a device presenting the virtual space to the user via the HMD 30. The type and the configuration of the virtual space presentation device 10 are not limited. The virtual space presentation device 10, for example, may be a mobile terminal such as an intelligent mobile phone (a smart phone), a tablet terminal, a wearable terminal, a laptop personal computer, and a mobile phone. Alternatively, the virtual space presentation device 10 may be a stationary terminal such as a desktop personal computer. In addition, the virtual space presentation device 10 may be a user terminal carried by each of the users as described above, or may be a server device configured such that communication is available with the user terminal of each of the users. Alternatively, the virtual space presentation device 10 may be configured by combining the user terminal and the server device. That is, the virtual space presentation device 10 may be composed of a single computer device, or may be composed of a plurality of computer devices capable of communicating with each other. In this embodiment, the virtual space presentation device 10 is configured by including the user terminal.

The content server 20 is a server managing the virtual space information. The content server 20 may be composed of a single computer device, or may be composed of a plurality of computer devices capable of communicating with each other. The content server 20 includes a storage unit 21 and a transmitting unit 22. The storage unit 21 stores the virtual space information. The transmitting unit 22 transmits the virtual space information to the virtual space presentation device 10.

The HMD 30 is a device mounted on the head of the user. The form of the HMD 30 is not limited to a specific form. The HMD 30, for example, may have various forms such as a goggle, a glass (glasses), and a hat. The HID 30, for example, is a smart glass such as an XR glass. In this embodiment, the HMD 30 is an AR glass having a function of presenting augmented reality (AR) to the user. For example, the HID 30 is a see-through glass configured such that the user is capable of visually recognizing the virtual space and the reality space (the external world). Here, the HMD 30 is not limited to the above, and may be an MR device such as an MR glass having a function of presenting mixed reality (MR) to the user, or may be a VR device such as a VR glass having a function of presenting virtual reality (VR) to the user. The HMD 30 includes a display unit 31 and a motion detection unit 32.

The display unit 31 is a display disposed in front of both eyes of the user. The display unit 31, for example, is composed of a liquid crystal display element, an organic electro luminescence (EL) element, or the like. The display unit 31 may include a display panel for a right eye disposed in front of the right eye of the user and a display panel for a left eye disposed in front of the left eye of the user, separately.

The motion detection unit 32 detects a change in the direction of the head of the user (that is, a change in the direction of the HMD 30 mounted on the head of the user). The motion detection unit 32, for example, is composed of a gyroscope sensor. The motion detection unit 32 outputs information indicating the detected motion of the head of the user to the virtual space presentation device 10.

The virtual space presentation device 10 includes an acquisition unit 11, a virtual space generation unit 12, a display control unit 13, a detection unit 14, a virtual space correction unit 15, and a display correction unit 16.

The acquisition unit 11 acquires (downloads) the virtual space information from the content server 20. Note that, a part or all of the virtual space information may be stored in advance in a storage unit of the virtual space presentation device 10 (for example, a storage 1003 or the like described below). In this case, the acquisition unit 11 may acquire the virtual space information by reading out the virtual space information stored in the storage unit.

The virtual space generation unit 12 generates the virtual space including the virtual viewpoint of the user inside on the basis of the virtual space information to allocate the content into the virtual space. Then, the display control unit 13 displays the generated virtual space on the display unit 31.

Figure 2:
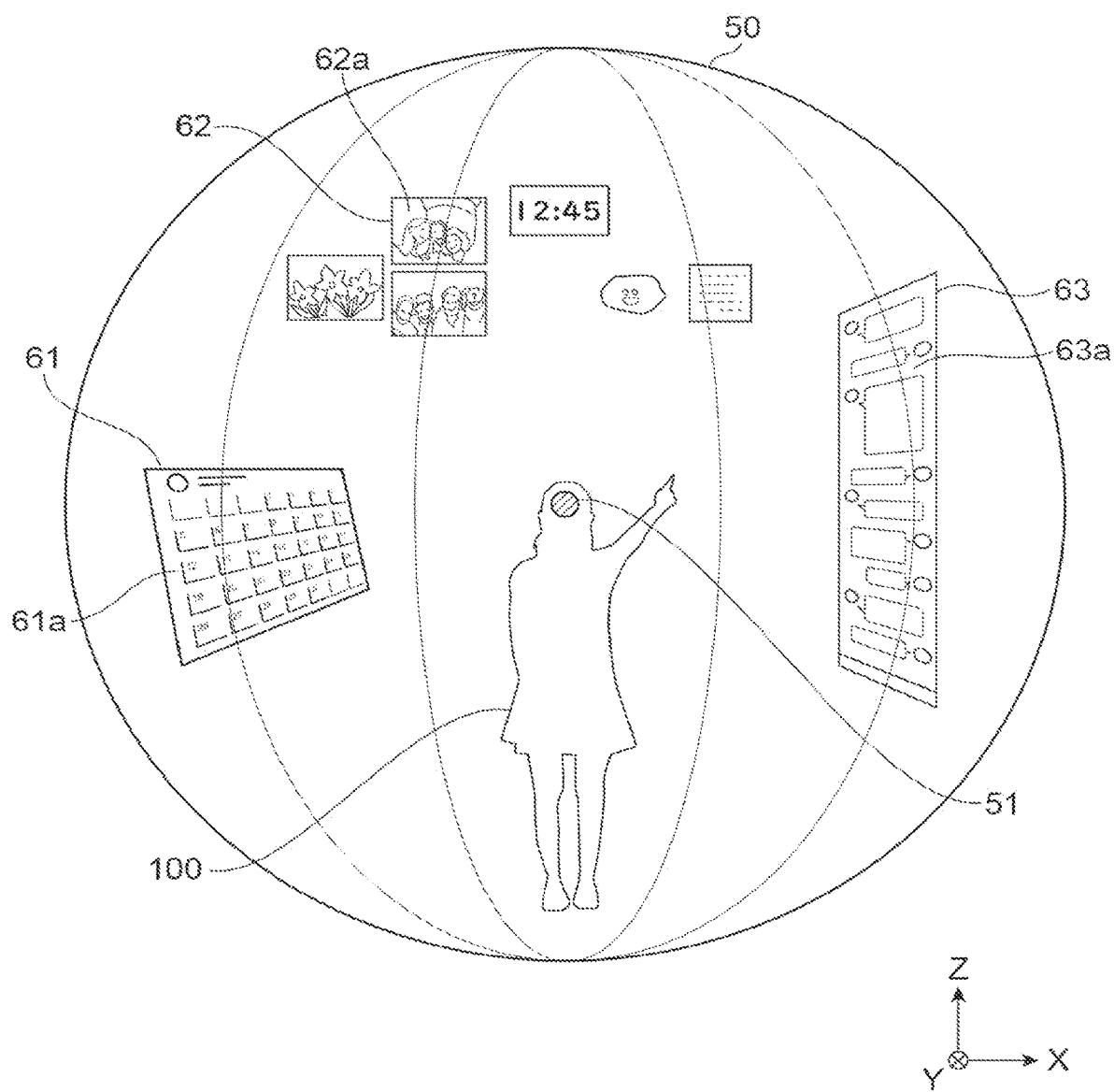
FIG. 2 is a diagram schematically illustrating an example of a virtual space.
Figure 3:
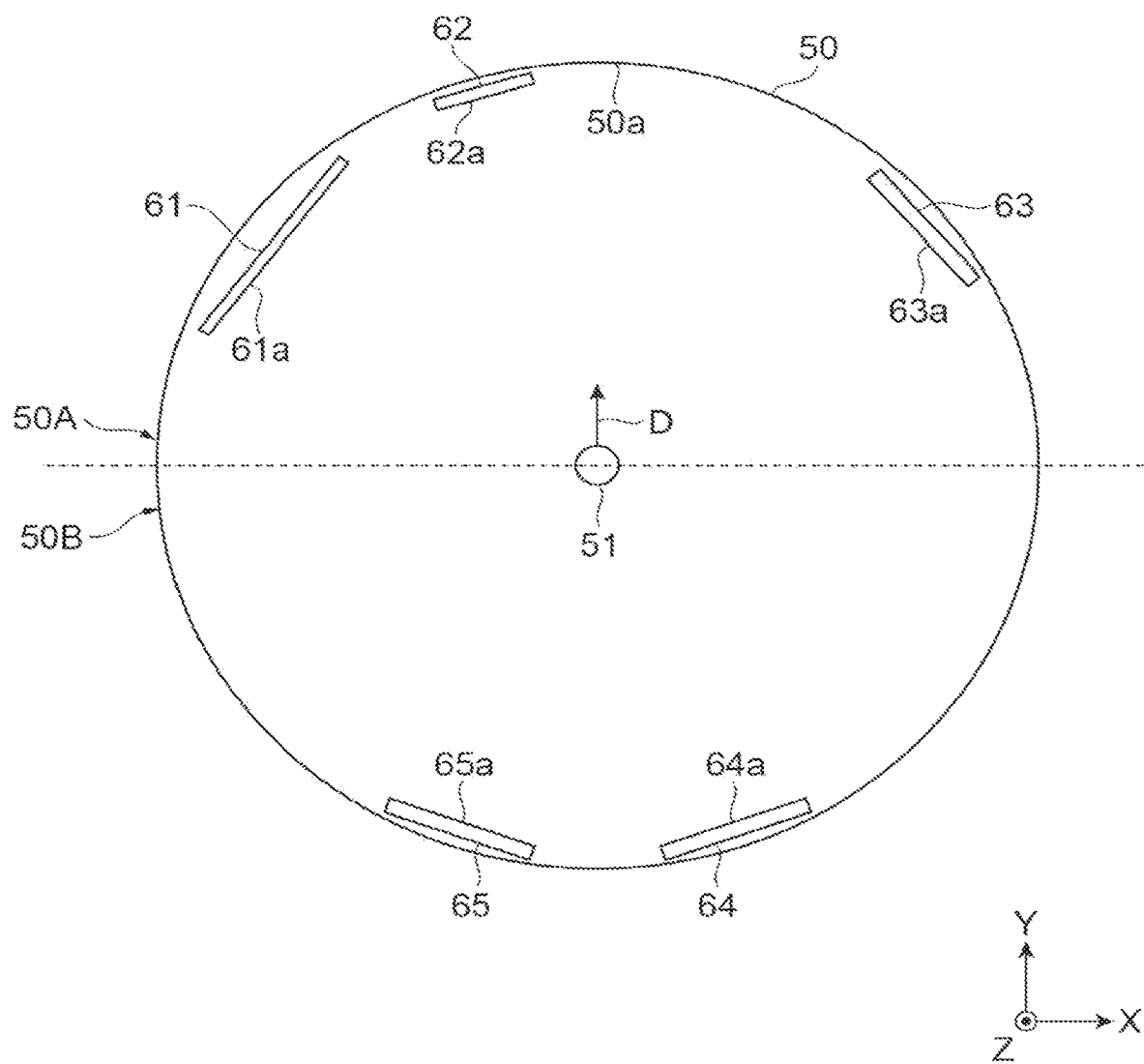
FIG. 3 is a diagram schematically illustrating a state in which the virtual space in FIG. 2 is seen from above.

With reference to FIG. 2 and FIG. 3, an example of the virtual space (a virtual space 50) generated by the virtual space generation unit 12 will be described. The virtual space 50 includes a virtual viewpoint 51 of the user inside. The virtual viewpoint 51 corresponds to the viewpoint of the user viewing the virtual space 50 via the display unit 31. A direction D illustrated in FIG. 3 is a direction indicating the front of the virtual viewpoint 51. On the display unit 31, an image (a virtual image) corresponding to a field of view when directed toward the direction D from the virtual viewpoint 51 is displayed. As a result thereof, the user is capable of feeling as if the user is in the virtual space 50 as a virtual user 100 illustrated in FIG. 2. In FIG. 2 and FIG. 3, for convenience sake, a direction parallel to the direction D (that is, a front-back direction seen from the user) is represented as a Y-axis direction, a right-left direction seen from the user is represented as an X-axis direction, and an up-down direction seen from the user is represented as a Z-axis direction.

As an example, the virtual space 50 is generated as a spherical space centered on the virtual viewpoint 51 in the initial state. The virtual space 50 includes one or more contents allocated along a spherical surface 50a centered on the virtual viewpoint 51. In this embodiment, the spherical surface 50a functions as a virtual omnidirectional display centered on the virtual viewpoint 51. That is, the user is capable of constructing a working space exclusive to the user by freely allocating one or more contents to a position along the spherical surface 50a. More specifically, the user is capable of newly generating (allocating) the content at a position along the spherical surface 50a, changing the position of the content, changing (enlarging or reducing) the size of the content, or deleting the content. Such a manipulation, for example, can be executed by using the user terminal.

The content is display information indicating any information. The content, for example, can be configured as a still image or a moving image. The type of content is not limited. The spherical surface 50a of the virtual space 50 is transparent (or semi-transparent) such that the user is capable of visually recognizing the reality space (the external world). Here, in a case where the HMD 30 is a device presenting the VR to the user (for example, the VR glass or the like), a non-transparent background image may be set on the spherical surface 50a of the virtual space 50.

In the example illustrated in FIG. 2 and FIG. 3, the virtual space 50 includes at least four contents 61, 62, 63, 64, and 65. In a case where the virtual space 50 is divided into a first part 50A ahead of the virtual viewpoint 51 and a second part 50B behind the virtual viewpoint 51, the contents 61, 62, and 63 are allocated to the first part 50A, and the contents 64 and 65 are allocated to the second part 50B.

The content 61 is display information indicating the schedule of the user. The content 62 is display information indicating a picture image selected by the user. The content 63 is display information indicating a screen of a predetermined application (for example, an application for presenting a chat function). The content 64 is display information indicating 3D data of a car (electronic data generated by 3D-scanning the car). The content 65 is display information indicating 3D data of a watch. As described above, various contents can be allocated to the virtual space 50 (in this embodiment, the position along the spherical surface 50a) in accordance with the preference of the user.

Each of the contents 61, 62, 63, 64, and 65 is allocated to face the virtual viewpoint 51. That is, display surfaces 61a, 62a, 63a, 64a, and 65a of the respective contents 61, 62, 63, 64, and 65 are allocated to face the center of the virtual space 50 (that is, the virtual viewpoint 51). The display surface is a surface on which the display information indicating the contents of the content, such as a still image or a moving image, is displayed.

The content may have a planar shape in which one surface is set as a display surface, or may have a three-dimensional shape. In addition, a first size applied to the content in a case where the virtual viewpoint 51 is positioned at the center of the virtual space 50, and a second size different from the first size are associated with the content. The second size, for example, is an actual size value when the content, which is the 3D data, is 3D-scanned.

Returning to FIG. 1, the detection unit 14 detects the action of the user set in advance. The action of the user is a general term for the operation and the manipulation of the user. Examples of the operation of the user include a motion in the reality space, such as a parallel movement, a gesture, a change in a posture, and the movement or the rotation of the user terminal. Examples of the manipulation of the user include a touch manipulation, a character input manipulation, and a voice input manipulation with respect to the user terminal. The detection unit 14, for example, detects the action of the user by an acceleration sensor, a gyroscope sensor, a touch panel, a camera, a microphone, and the like provided in the user terminal.

The examples of the operation and the manipulation of the user are not limited to the above. For example, the detection unit 14 may display buttons indicating instruction contents such as "move up", "move down", "move left", "move right", and "rotate" on the user terminal. The detection unit 14 may receive the press of any button by the user, and detect the touched instruction contents as the action of the user.

In addition, the detection unit 14 determines a movement amount of the virtual viewpoint 51 according to the action. The detection unit 14, for example, determines the movement amount of the virtual viewpoint 51 according to the action on the basis of a movement distance in the reality space, a movement distance of the hand in a hand gesture, a change amount of the posture, a movement distance of the user terminal, a movement amount associated with each voice such as "a little closer", and the length of time for pressing the button.

The detection unit 14 may detect the action of the user selecting the content. For example, the detection unit 14 may detect the selection of a specific content by receiving the touch manipulation of the content from a schematic view of the virtual space 50 displayed on the user terminal. As an example, the detection unit 14 may determine the movement amount of the virtual viewpoint 51 according to the action of the user in a state where the specific content is selected. In a case where the specific content is selected, the detection unit 14 may determine a movement amount in a direction toward the specific content from the virtual viewpoint 51.

The detection unit 14 may detect information indicating a change in the direction of the head of the user, which is acquired from the HMD 30, as the action of the user. The detection unit 14 may detect the action of the user in cooperation with the HMD 30. For example, the HMD 30 has a function of recognizing the user terminal in a case where the user terminal is reflected within a range that can be visually recognized via the display unit 31, which is the see-through glass. The HMD 30 outputs virtual laser light from the tip end of the recognized user terminal. That is, the virtual space presentation device 10 (for example, the display control unit 13) displays such virtual laser light on the display unit 31. According to such processing, the user is capable of using the user terminal as a virtual laser pointer. The user is capable of selecting the specific content by moving the user terminal and applying the virtual laser light output from the user terminal to the specific content.

The virtual space correction unit 15 moves the virtual viewpoint 51 in the virtual space 50 on the basis of the movement amount of the virtual viewpoint 51 determined by the detection unit 14 to correct the virtual space 50 to a state seen from the moved virtual viewpoint 51. In addition, the virtual space correction unit 15 computes a display magnification of the content on the basis of the moved virtual viewpoint 51, and the first size and the second size associated with the content, and allocates the content to which a size according to the computed display magnification is applied to the corrected virtual space 50. The processing of computing the display magnification will be described below. Then, the display correction unit 16 displays the corrected virtual space 50 on the display unit 31.

FIG. 4 is a diagram schematically illustrating the movement of the virtual viewpoint 51. FIG. 4(a) is a diagram illustrating the virtual viewpoint 51 before the movement. The virtual viewpoint 51 is at a position P1 that is the center of the virtual space 50. The direction D illustrated in FIG. 4(a) faces the content 64. A distance L1 between the position P1 and the content 64, for example, is 2.0 in.

From the state illustrated in FIG. 4(a), the detection unit 14 determines the movement amount according to the detected action of the user. The virtual space correction unit 15 moves the virtual viewpoint 51 on the basis of the determined movement amount. FIG. 4(b) is a diagram illustrating the moved virtual viewpoint 51. In this example, the virtual space correction unit 15 moves the virtual viewpoint 51 to a position P2 from the position P1, which is the initial position. A distance L2 between the position P2 and the content 64, for example, is 0.5 m. The position P2 is a position at which the virtual viewpoint 51 is moved toward the content 64 from the position P1 by a movement amount ΔP (for example, 1.5 m). The direction D illustrated in FIG. 4(b) faces the content 64.

In this embodiment, as an example, the movement of the virtual viewpoint 51 can be attained by switching between 3 degrees of freedom (DoF) and 6 DoF. For example, the detection unit 14 and the virtual space correction unit 15 switch 3 DoF to 6 DoF with the detection of the action of the user set in advance as a trigger.

In 3 DoF, even in a case where the user (technically the HMD 30 mounted on the head of the user) is moved in parallel in the reality space, the virtual viewpoint 51 in the virtual space 50 is not moved. That is, the user (the virtual viewpoint 51) is fixed at the center position of the virtual space 50, and is not capable of being moved to another place on the virtual space 50 from the center position of the virtual space 50. On the other hand, in a case where the user performs an operation of rotating or tilting the head (that is, the HMD 30 mounted on the head) in the up-down direction or the right-left direction, the virtual space 50 is rotated in accordance with the operation. More specifically, in a case where the user rotates the head by 90 degrees clockwise, the virtual space 50 is rotated by the same amount (in this example, 90 degrees) in a direction opposite to a rotation direction of the head of the user (in this example, counter-clockwise). In a case where the user rotates the head to change the viewpoint, in accordance with the rotation, the direction D for defining the field of view of the user in the virtual space 50 is changed.

In 6 DoF, in addition to the motion of 3 DoF, the parallel movement in the reality space is recognized. For example, in 6 DoF, the virtual viewpoint 51 can be moved on the basis of the parallel movement of the user in the reality space. In an example, in a case where the virtual space correction unit 15 is operated in a 6 DoF mode, and the user moves toward the specific content, in accordance with the movement, the virtual viewpoint 51 may be moved. Then, the virtual space correction unit 15 corrects the virtual space 50 to the state seen from the moved virtual viewpoint 51. Here, as described above, the action that triggers the movement of the virtual viewpoint 51 is not limited to the movement of the user in the reality space.

The virtual viewpoint 51 can be moved in both of the positive and negative directions of each of an X-axis, a Y-axis, and a Z-axis in the virtual space 50. That is, the virtual viewpoint 51 can be moved to any position of the virtual space 50.

Figure 5:
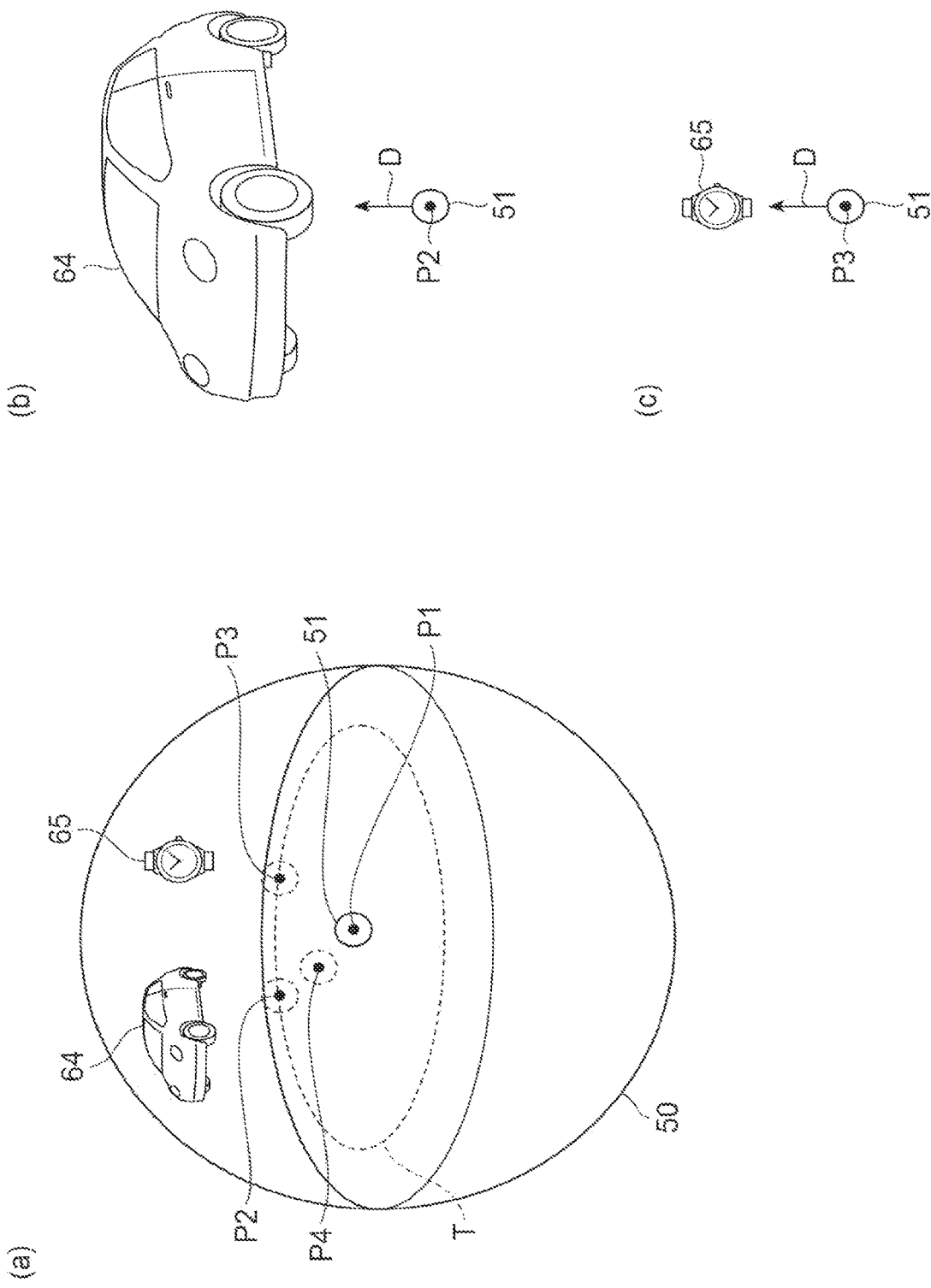
FIG. 5 is a diagram schematically illustrating a difference in a display magnification for each content.

FIG. 5 is a diagram schematically illustrating a difference in the display magnification for each of the contents. FIG. 5(a) is a diagram illustrating an example of the appearance of the contents 64 and 65 (that is, the size of the contents 64 and 65 with respect to the virtual space 50) when the virtual viewpoint 51 is at the center (the position P1) of the virtual space 50. A broken line T indicates a position at which a distance from the position P1 is 1.5 m. The position P2 is on the broken line T between the position P1 and the content 64. A position P3 is on the broken line T between the position P1 and the content 65. A position P4 is within a range surrounded by the broken line T between the position P1 and the content 64. A distance between the position P4 and the content 64, for example, is 1.0 m. Hereinafter, the processing of the virtual space correction unit 15 will be described by using a case where the virtual space correction unit 15 moves the virtual viewpoint 51 to each of the positions P2, P3, and P4 from the position P1, as an example.

FIG. 5(b) is a diagram illustrating the appearance of the content 64 (that is, the size of the content 64 with respect to the virtual space 50) after the virtual viewpoint 51 is moved to the position P2. As an example, a first size having a length of 90 cm, a width of 36 cm, and a height of 30 cm, and a second size having a length of 450 cm, a width of 180 cm, and a height of 150 cm are associated with the content 64. The first size is a size obtained by converting the second size at a scale of ⅕. In addition, the distance between the position P1 and the content 64 is 2.0 m, and the distance between the position P2 and the content 64 is 0.5 m. In a case where the distance between the position P1 and the content 64 is a reference value "1", the distance between the position P2 and the content 64 can be represented by "¼ (=0.5/2.0)". In other words, it can be said that the virtual viewpoint 51 approaches the content 64 by "¾" of the original content distance (the distance between virtual viewpoint 51 and the content 64) in accordance with the movement of the virtual viewpoint 51 to the position P2 from the position P1. Hereinafter, such a distance by which the virtual viewpoint 51 approaches the content 64 (in the example described above, "¾") will be referred to as a content accessibility.

In this embodiment, as an example, in a case where the first size is smaller than the second size, the virtual space correction unit 15 computes a value obtained by multiplying the reciprocal of the scale (first size/second size) by the content accessibility, as the display magnification. That is, in the example of the content 64 described above, the virtual space correction unit 15 computes the display magnification of the content 64 as 3.75 times by scale $(1/5)^{-1}$×content accessibility (¾). The display magnification is a magnification with respect to the first size. The virtual space correction unit 15 allocates the content 64 to which a size having a length of 337.5 cm, a width of 135 cm, and a height of 112.5 cm is applied by multiplying the first size of the content 64 by the display magnification of 3.75 to the corrected virtual space 50. That is, the virtual space correction unit 15 changes (in this example, enlarges) the size of the content 64 in the virtual space 50 on the basis of the computed display magnification as described above.

FIG. 5(c) is a diagram illustrating the appearance of the content 64 when the virtual viewpoint 51 is moved to the position P3. As an example, a first size having a length of 50 cm, a width of 50 cm, and a height of 50 cm, and a second size having a length of 5 cm, a width of 5 cm, and a height of 5 cm are associated with the content 65. The first size is a size obtained by converting the second size at 10 times. In addition, the distance between the position P1 and the content 65 is 2.0 in, and the distance between the position P3 and the content 65 is 0.5 m. In this case, a content accessibility with respect to the content 65 is "¾".

In this embodiment, as an example, in a case where the first size is smaller than the second size, the virtual space correction unit 15 computes a value obtained by multiplying the reciprocal of the scale (first size/second size) by the reciprocal of the content accessibility, as the display magnification. That is, in the example of the content 65 described above, the virtual space correction unit 15, for example, computes the display magnification as 2/15 times by magnification $(10)^{-1}$×distance $(3/4)^{-1}$. The virtual space correction unit 15 allocates the content 65 to which a size having a length of 6.7 cm, a width of 6.7 cm, and a height of 6.7 cm is applied by multiplying the first size of the content 65 by the display magnification of 2/15 to the corrected virtual space 50. That is, the virtual space correction unit 15 changes (in this example, reduces) the size of the content 65 in the virtual space 50 on the basis of the computed display magnification as described above. As described above, the virtual space correction unit 15 computes the display magnification for each of the contents.

In addition, the virtual space correction unit 15 may control the display magnification of the content by using a threshold value. For example, the virtual space correction unit 15 may judge whether a distance between the virtual viewpoint 51 and the content is inside the threshold value. Here, as an example, the virtual space correction unit 15 uses "0.5 m" as the threshold value. In this case, for example, in a case where the distance between the virtual viewpoint 51 and the content is the threshold value or less (that is, in a case where the virtual viewpoint 51 is on the broken line T and closer to the content than the broken line T), the virtual space correction unit 15 judges that the distance between the virtual viewpoint 51 and the content is inside the threshold value. On the other hand, for example, in a case where the distance between the virtual viewpoint 51 and the content is greater than the threshold value (that is, the virtual viewpoint 51 is in the range surrounded by the broken line T), the virtual space correction unit 15 judges that the distance between the virtual viewpoint 51 and the content is outside the threshold value. Note that, the threshold value described above may be set on the basis of the content accessibility described above. For example, in the case of desiring to judge a case where the content accessibility is "¾" or more as being "inside the threshold value", a value (in the example described above, "0.5 m") obtained by multiplying the original distance between the virtual viewpoint 51 and the content (in the example described above, "2.0 m") by "1—content accessibility (in the example described above, "¼")" may be set as the threshold value.

For example, in a case where the distance between the virtual viewpoint 51 and the content is inside a predetermined threshold value, the virtual space correction unit 15 may allocate a content to which the second size is applied to the corrected virtual space 50. That is, the virtual space correction unit 15 may apply the second size to the content when the virtual viewpoint 51 approaches the content by a certain amount or more, and may not change the size of the content (that is, maintain the size of the content at the second size) even in a case where the virtual viewpoint 51 further approaches the content. For example, in a case where the virtual viewpoint 51 is moved to the position P2 (that is, in a case where the distance between the virtual viewpoint 51 and the content 64 is inside the threshold value), the virtual space correction unit 15 allocates the content 64 to which the second size is applied to the corrected virtual space 50.

In addition, in a case where a distance between the moved virtual viewpoint 51 and the content is outside the predetermined threshold value, the virtual space correction unit 15 may execute the processing of either a first example or a second example described below. Which of the first example and the second example is to be executed, for example, may be arbitrarily switched by the setting of the user, or may be individually set for each of the contents.

First Example

In a case where the distance between the virtual viewpoint 51 and the content is outside the predetermined threshold value, the virtual space correction unit 15 computes the display magnification for each movement of the virtual viewpoint 51 on the basis of the moved virtual viewpoint 51, and the first size and the second size associated with the content. For example, in a case where the virtual viewpoint 51 is moved to the position P4, the virtual space correction unit 15 judges that the distance between the virtual viewpoint 51 and the content 64 is outside the threshold value (0.5 m). In this case, the virtual space correction unit 15, for example, computes the display magnification by a calculation method based on the scale and the content accessibility described above, and allocates the content 64 to which the size according to the computed display magnification is applied to the corrected virtual space 50. In addition, in a case where the virtual viewpoint 51 is moved to another position in the range surrounded by the broken line T from the position P4, the display magnification is computed again.

According to the first example, it is possible to make the display size of the content 64 in the virtual space 50 gradually closer to the second size from the first size as the virtual viewpoint 51 approaches the content 64. As with this embodiment, in a case where the original size (the actual size) of the content is set as the second size, it is possible to gradually change the size of the content to the original size (the second size) from the temporary size (the first size) as the virtual viewpoint 51 approaches the content. According to the configuration described above, since the size of the content can be smoothly transitioned to the second size from the first size in accordance with the movement of the virtual viewpoint 51 (that is, the access to the content), it is possible to suppress or reduce the occurrence of the uncomfortable feeling of the user due to a change in the size of the content.

Second Example

In a case where the distance between the virtual viewpoint 51 and the content is outside the predetermined threshold value, the virtual space correction unit 15 fixes the size of the content to the first size. In the example of FIG. 5, in a case where the virtual viewpoint 51 is between the position P1 and the position P2, the virtual space correction unit 15 fixes (maintains) the size of the content 64 to the first size. That is, in the second example, the virtual space correction unit 15 computes the display magnification of the content only when the distance between the moved virtual viewpoint 51 and the content is inside the threshold value on the basis of the moved virtual viewpoint 51, and the first size and the second size associated with the content, and applies the size according to the computed display magnification to the content. As an example, in a case where the distance between the moved virtual viewpoint 51 and the content is inside the threshold value, the virtual space correction unit 15 applies the display magnification "second size/first size" to the content to change the size of the content to the second size from the first size.

According to the second example, since it is possible to omit the processing of calculating the display magnification when the distance between the virtual viewpoint 51 and the content is outside the predetermined threshold value, it is possible to reduce a calculation amount and a processing time relevant to the calculation of the display magnification. In addition, it is possible to rapidly change the size of the content to the second size from the first size when the distance between the virtual viewpoint 51 and the content is inside the threshold value. According to the configuration described above, it is possible to impart an impact to the user by presenting the original size (the second size) of the content to the user only when the user (the virtual viewpoint 51) approaches the content to some extent. As a result thereof, it is possible to effectively increase the entertainment of the virtual experience of the user.

FIG. 6 is a diagram illustrating an example of the virtual space information. For example, the storage unit 21 stores content data, the first size, the second size, a mode, and the like, in association with an ID for uniquely specifying the virtual space information. The storage unit 21 may store information other than the above. The content data is electronic data indicating the details of the content. The mode, for example, includes "approach" and "actual size" as two types of modes. In the "approach", for example, the virtual space correction unit 15 computes the display magnification of the content regardless of the threshold value described above (that is, the threshold value relevant to the distance between the virtual viewpoint 51 and the content), and allocates the content to which the size according to the computed display magnification is applied to the corrected virtual space 50. On the other hand, in the "actual size", the virtual space correction unit 15 controls the display magnification of the content by using the threshold value described above, and allocates the content to which the second size is applied to the corrected virtual space 50 in a case where the distance between the virtual viewpoint 51 and the content is inside the predetermined threshold value. As described above, different control contents may be set for each of the contents. In addition, which control of the first example and the second example described above is to be applied when the distance between the virtual viewpoint 51 and the content is outside the threshold value may be individually set for each of the contents.

Figure 7:
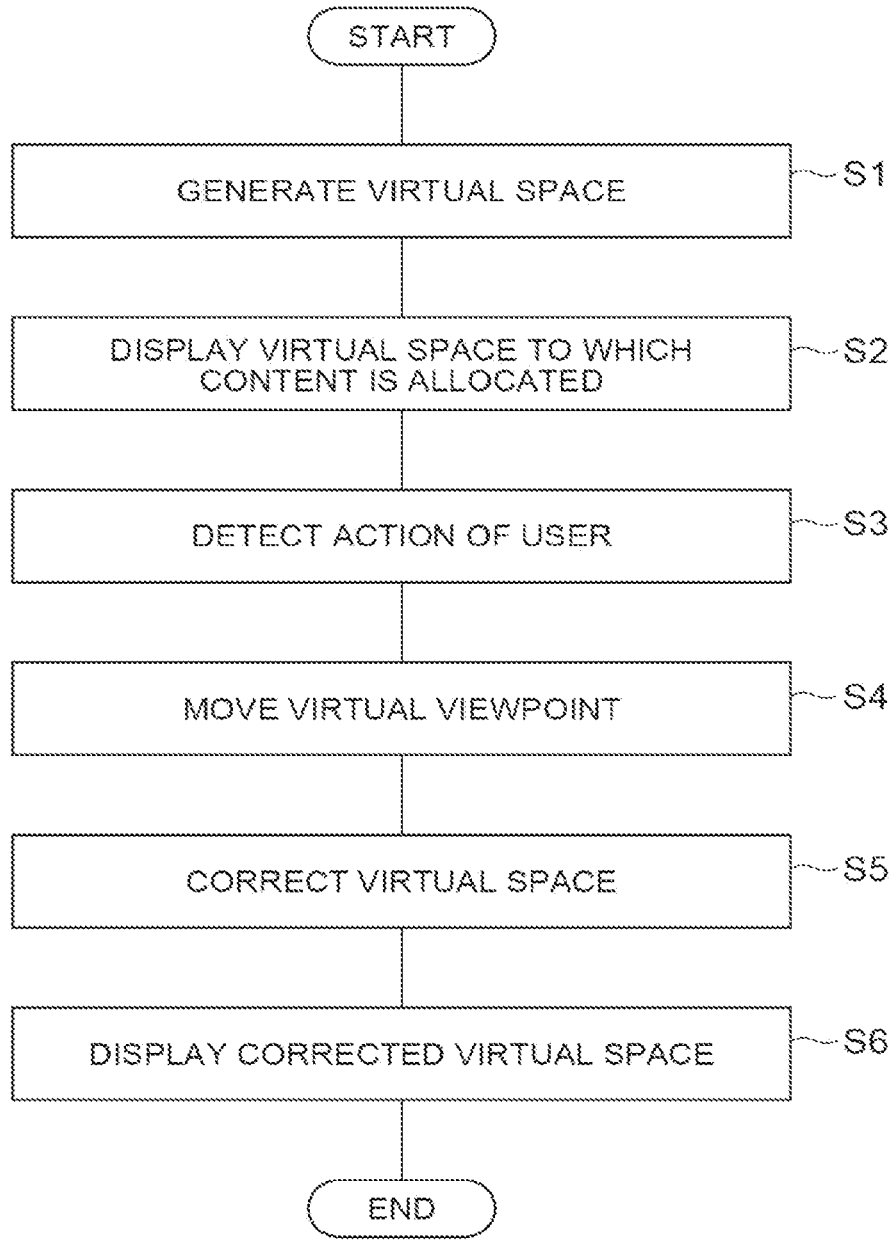
FIG. 7 is a flowchart illustrating an example of an operation of the virtual space presentation system.

Next, with reference to FIG. 7, an example of the operation of the virtual space presentation system 1 (including a virtual space presentation method according to the embodiment) will be described.

In step S1, the virtual space generation unit 12 generates the virtual space 50 including the virtual viewpoint 51 of the user inside to allocate the content into the virtual space 50 (refer to FIG. 2 and FIG. 3).

In step S2, the display control unit 13 displays the virtual space 50 on the display unit 31. More specifically, the display control unit 13 displays the image (the virtual image) corresponding to the field of view when directed toward the direction D from the virtual viewpoint 51 on the display unit 31. Accordingly, the virtual space 50 is presented to the user.

In step S3, the detection unit 14 detects the action of the user set in advance to determine the movement amount of the virtual viewpoint 51 according to the action (refer to FIG. 4).

In step S4, the virtual space correction unit 15 moves the virtual viewpoint 51 in the virtual space 50 on the basis of the movement amount of the virtual viewpoint 51 determined by the detection unit 14 (refer to FIG. 5).

In step S5, the virtual space correction unit 15 corrects the virtual space 50 to the state seen from the moved virtual viewpoint 51. In addition, the virtual space correction unit 15 computes the display magnification of the content on the basis of the moved virtual viewpoint 51, and the first size and the second size associated with the content, and allocates the content to which the size according to the computed display magnification is applied to the corrected virtual space 50 (refer to FIG. 5).

In step S6, the display correction unit 16 displays the corrected virtual space 50 on the display unit 31. Accordingly, the corrected virtual space 50 is presented to the user.

As described above, in the virtual space presentation device 10, the virtual space 50 to which the content is allocated is presented to the user. Then, in a case where the movement amount of the virtual viewpoint 51 according to the action of the predetermined user is determined, the corrected virtual space 50 seen from the moved virtual viewpoint 51 is presented to the user. The content to which size according to the display magnification determined for each of the contents on the basis of the moved virtual viewpoint 51, and the first size and the second size associated with the content is applied is allocated to the corrected virtual space 50. According to the virtual space presentation device 10, the appearance of each of the contents is changed in accordance with the virtual viewpoint 51, and the first size and the second size associated with the content. Accordingly, the user is capable of adjusting the content to a desired appearance on the corrected virtual space 50. As a result thereof, it is possible to display the content in the virtual space 50 at a suitable size.

In addition, for example, in a case where the size of a part of the contents allocated to the virtual space 50 is enlarged regardless of the movement of the virtual viewpoint 51 of the user (that is, in a state where the virtual viewpoint 51 of the user is fixed at the center of the virtual space 50), the content that is to be originally visible from the virtual viewpoint 51 of the user is hidden by the enlarged content, which may give a sense of dissatisfaction to the user. On the other hand, according to the virtual space presentation device 10, since a change in the size of the content is executed in accordance with the movement of the virtual viewpoint 51 in the virtual space 50, it is possible to avoid the occurrence of the dissatisfaction of the user as described above.

In a case where the distance between the moved virtual viewpoint 51 and the content is inside the predetermined threshold value, the virtual space correction unit 15 may allocate the content to which the second size is applied to the corrected virtual space 50. For example, in a case where the second size is the actual size value when the content, which is the 3D data, is 3D-scanned, it can be said that the suitable size of the content is the second size. According to the configuration described above, in a case where the virtual viewpoint 51 approaches the content by a certain amount or more, the content with the second size (for example, the content to which the real size is applied) can be visually recognized by the user.

In a case where the distance between the moved virtual viewpoint 51 and the content is outside the predetermined threshold value, the virtual space correction unit 15 may compute the display magnification for each movement of the virtual viewpoint 51 on the basis of the moved virtual viewpoint 51, and the first size and the second size associated with the content. That is, in a case where the distance between the virtual viewpoint 51 and the content is outside the predetermined threshold value, the virtual space correction unit 15 may execute the processing of the first example described above.

According to the configuration described above, it is possible to obtain the effect of the first example described above.

In a case where the distance between the moved virtual viewpoint and the content is outside the predetermined threshold value, the virtual space correction unit 15 may fix the size of the content to the first size. That is, in a case where the distance between the virtual viewpoint 51 and the content is outside the predetermined threshold value, the virtual space correction unit 15 may execute the processing of the second example described above. According to the configuration described above, it is possible to obtain the effect of the second example described above.

The virtual space generation unit 12 may generate the spherical virtual space 50 centered on the virtual viewpoint 51 in the initial state. In this case, the content is allocated around the user. Since even in a case where a plurality of contents are allocated to the virtual space 50, a seamless list display of each of the contents is available, the convenience of the user is improved.

The display control unit 13 may allocate the content along the spherical surface 50*a* of the virtual space 50. The spherical surface 50*a* functions as the virtual omnidirectional display centered on the virtual viewpoint 51. Since the working space exclusive to the user can be constructed at the position along the spherical surface 50*a*, the convenience of the user is improved. Note that, even in a case where each of the contents is allocated at any size, as described above, the user is capable of adjusting each of the contents to a desired appearance.

Modification Example

In the embodiment described above, each of the contents is allocated to the position along the spherical surface 50*a*, but the position to which the content is allocated in the virtual space 50 is not limited to the above. For example, the content may be allocated to a position separated from the spherical surface 50*a* (a position closer to the virtual viewpoint 51 than the contents 61, 62, 63, 64, and 65 in the embodiment described above).

In addition, in the embodiment described above, a difference in the appearance between the contents 64 and 65 has been mainly described, but the same processing as that in the embodiment described above can be executed on the other contents (for example, the contents 61, 62, and 63).

In addition, in the embodiment described above, the spherical virtual space 50 has been exemplified, but a virtual space in a shape other than the spherical shape (such as a cuboidal virtual space representing a virtual room space) may be generated by the virtual space generation unit 12.

In addition, in the embodiment described above, in a case where the distance between the moved virtual viewpoint 51 and the content is inside the predetermined threshold value, the content to which the second size is applied is allocated to the virtual space 50, but the second size may be applied to the content in a case where another condition is satisfied together with the condition relevant to the threshold value described above. For example, the detection unit 14 detects a specific action such as a user holding the hand over a specific content. In a case where a distance between the moved virtual viewpoint 51 and the specific content is inside the predetermined threshold value, and the specific action of the user is detected, the virtual space correction unit 15 may allocate the content to which the second size is applied to the corrected virtual space 50.

In addition, in the embodiment described above, the virtual space presentation device 10 functions alone as the virtual space presentation device, but the virtual space presentation device may be attained by a plurality of devices. For example, a part of the functions of the virtual space presentation device 10 described above (for example, the virtual space generation unit 12, the detection unit 14, the virtual space correction unit 15, and the like) may be implemented on an external device (for example, the HMD 30, other external servers, or the like) other than the virtual space presentation device 10.

In addition, the user terminal is an exclusive controller device.

In addition, in the embodiment described above, an example has been described in which various manipulations are performed by the user terminal, but various manipulations may be performed by the HMD 30.

For example, the HMD 30 may include a motion sensor detecting the gesture of the user, or the like, and perform a user manipulation with respect to the virtual space 50 in accordance with the gesture of the user (for example, a hand gesture or the like).

Note that, a block diagram used for the description of the above embodiment illustrates the blocks of function units. Such function blocks (configuration units) are attained by any combination of at least one of hardware and software. In addition, a method for attaining each of the function blocks is not particularly limited. That is, each of the function blocks may be attained by using one physically or logically coupled device, or may be attained by using a plurality of devices obtained by directly or indirectly (for example, in a wired or wireless manner) connecting two or more devices physically or logically separated from each other. The function block may be attained by combining software with the one device or the plurality of devices.

The function includes determining, judging, calculating, computing, processing, deriving, investigating, searching, ascertaining, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, and the like, but is not limited thereto.

Figure 8:
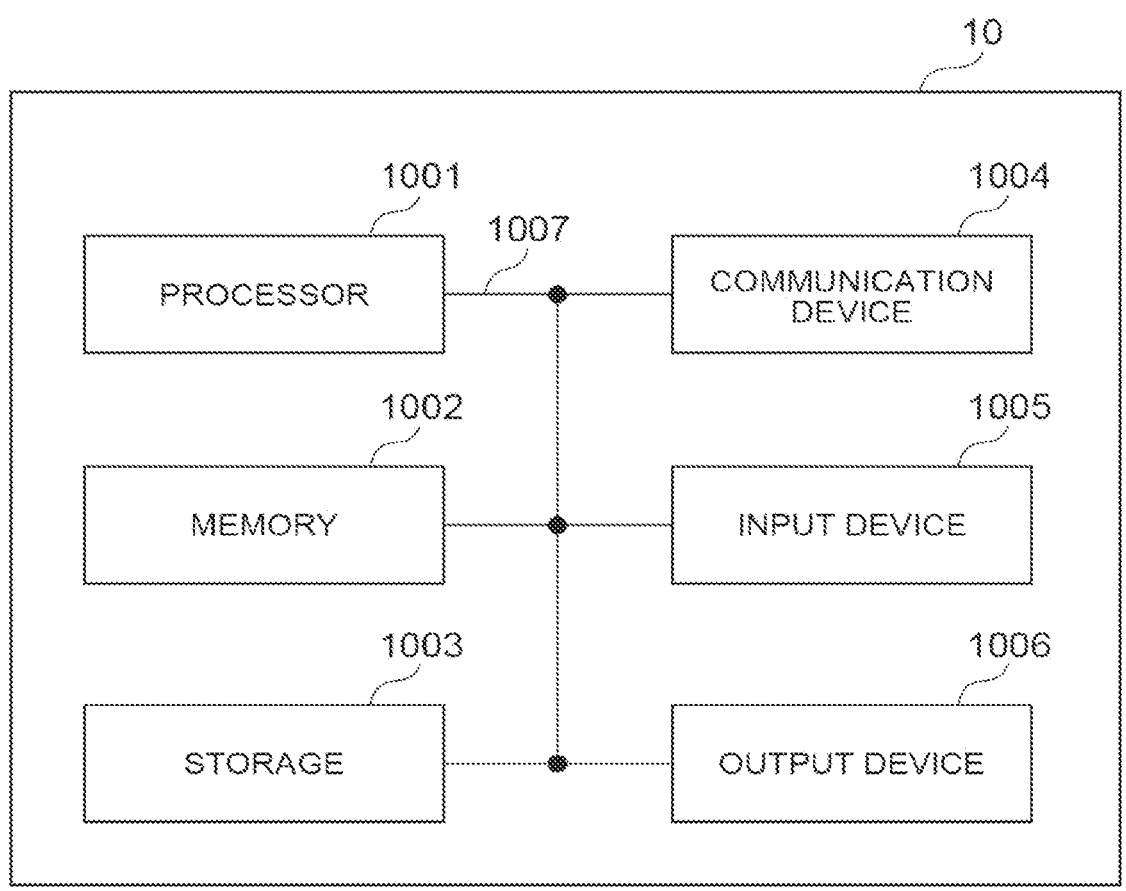
FIG. 8 is a diagram illustrating an example of a hardware configuration of the virtual space presentation device.

For example, the virtual space presentation device 10 in one embodiment of the present disclosure may function as a computer performing the virtual space presentation method of the present disclosure. FIG. 8 is a diagram illustrating an example of a hardware configuration of the virtual space presentation device 10 according to one embodiment of the present disclosure. Each of the virtual space presentation devices 10 may be physically configured as a computer device including a processor 1001, a memory 1002, a storage 1003, a communication device 1004, an input device 1005, an output device 1006, a bus 1007, and the like.

Note that, in the following description, the word "device" can be replaced with a circuit, a unit, or the like. The hardware configuration of the virtual space presentation device 10 may be configured to include one or a plurality of devices illustrated in FIG. 8, or configured to exclude some devices.

Each of the functions in the virtual space presentation device 10 is attained by reading predetermined software (program) on the hardware such as the processor 1001 and the memory 1002 such that the processor 1001 performs arithmetic, and controlling the communication of the communication device 1004 or controlling at least one of the reading and the writing of data in the memory 1002 and the storage 1003.

The processor 1001, for example, controls the entire computer by operating an operating system. The processor 1001 may be composed of a central processing unit (CPU) including an interface with a peripheral device, a control device, an arithmetic device, a register, and the like.

In addition, the processor 1001 reads out a program (a program code), a software module, data, and the like from at least one of the storage 1003 and the communication device 1004 to the memory 1002, and executes various processing pieces in accordance with the program and the like. As the program, a program for allowing a computer to execute at least a part of the operation described in the above embodiment is used. For example, each of the function units (for example, the virtual space generation unit 12 and the like) of the virtual space presentation device 10 may be attained by a control program that is stored in the memory 1002 and operated in the processor 1001, and the other function blocks may be attained similarly. It has been described that the various processing pieces described above are executed by one processor 1001, but the various processing pieces may be simultaneously or sequentially executed by two or more processors 1001. The processor 1001 may be implemented by one or more chips.

Note that, the program may be transmitted from a network via an electric communication line.

The memory 1002 is a computer-readable recording medium, and for example, may be composed of at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), and the like.

The memory 1002 may store a program (a program code), a software module, and the like that can be executed to carry out the virtual space presentation method according to one embodiment of the present disclosure.

The storage 1003 is a computer-readable recording medium, and for example, may be composed of at least one of an optical disk such as a compact disc ROM (CD-ROM), a hard disk drive, a flexible disk, a magnetooptic disk (for example, a compact disk, a digital versatile disk, and a Blu-ray (Registered Trademark) disk), a smart card, a flash memory (for example, a card, a stick, and a key drive), a floppy (Registered Trademark) disk, a magnetic strip, and the like. The storage 1003 may be referred to as an auxiliary storage device. The storage medium described above, for example, may be a database, a server, and other suitable media including at least one of the memory 1002 and the storage 1003.

The communication device 1004 is hardware (a transmitting and receiving device) for performing communication with respect to a computer via at least one of a wired network and a wireless network, and for example, is also referred to as a network device, a network controller, a network card, a communication module, and the like.

The input device 1005 is an input device (for example, a keyboard, a mouse, a microphone, a switch, a button, a sensor, and the like) receiving input from the outside. The output device 1006 is an output device (for example, a display, a speaker, an LED lamp, and the like) carrying out output to the outside. Note that, the input device 1005 and the output device 1006 may have an integrated configuration (for example, a touch panel).

In addition, each of the devices such as the processor 1001 and the memory 1002 is connected by the bus 1007 for performing the communication of the information. The bus 1007 may be configured by using a single bus, or may be configured by using different buses for each of the devices.

In addition, the virtual space presentation device 10 may be configured by including hardware such as a microprocessor, a digital signal processor (DSP), an application specific integrated circuit (ASIC), a programmable logic device (PLD), and a field programmable gate array (FPGA), and a part or all of each of the function blocks may be attained by the hardware. For example, the processor 1001 may be implemented by using at least one of the hardware.

This embodiment has been described in detail, but it is obvious to a person skilled in the art that this embodiment is not limited to the embodiment described in this specification. This embodiment can be carried out as modifications and variations without departing from the spirit and the scope of the present invention defined by the claims. Therefore, the description of this specification is for illustrative purpose and is not intended to have any restrictive meaning on this embodiment.

The order of the processing procedure, the sequence, the flowchart, and the like of each of the aspects/embodiments described in the present disclosure may be changed unless there is contradiction.

For example, in the method described in the present disclosure, the elements of various steps are presented by using an exemplary order, but the present disclosure is not limited to the presented specific order.

The input and output information or the like may be stored in a specific place (for example, a memory), or may be managed by using a management table. The input and output information or the like can be overwritten, updated, or edited. The output information or the like may be deleted. The input information or the like may be transmitted to other devices.

The judging may be performed by a value represented by 1 bit (0 or 1), may be performed by a truth value (Boolean: true or false), or may be performed by comparing numerical values (for example, comparing with a predetermined value).

Each of the aspects/embodiments described in the present disclosure may be used alone, may be used in combination, or may be used by being switched in accordance with the execution. In addition, the notifying of predetermined information (for example, the notifying of "X") is not limited to being performed explicitly, but may be performed implicitly (for example, by not performing the notifying of the predetermined information).

The software should be broadly construed to indicate an instruction, an instruction set, a code, a code segment, a program code, a program, a sub-program, a software module, an application, a software application, a software package, a routine, a sub-routine, an object, an executable file, an execution thread, a procedure, a function, and the like, regardless of being referred to as software, firmware, middleware, a microcode, and a hardware description language, or referred to as other names.

In addition, the software, the instruction, the information, and the like may be transmitted and received via a transmission medium. For example, in a case where the software is transmitted from a website, a server, or other remote sources by using at least one of a wired technology (a coaxial cable, an optical fiber cable, a twisted pair, a digital subscriber line (DSL), and the like) and a wireless technology (an infrared ray, a microwave, and the like), at least one of the wired technology and the wireless technology is included in the definition of the transmission medium.

The information, the signal, and the like described in the present disclosure may be represented by using any of various different technologies. For example, the data, the instruction, the command, the information, the signal, the bit, the symbol, the chip, and the like, which can be mentioned over the above entire description, may be represented by a voltage, a current, an electromagnetic wave, a magnetic field or magnetic particles, an optical field or photons, or any combination thereof.

In addition, the information, the parameter, and the like described in the present disclosure may be represented by using an absolute value, may be represented by using a relative value from a predetermined value, or may be represented by using another corresponding information.

The names used for the parameters described above are not the restrictive name in any respect. Further, a math expression or the like using such parameters may be different from that explicitly disclosed in the present disclosure. Since various information elements can be identified by any suitable name, various names allocated to the various information elements are not the restrictive name in any respect.

The expression "on the basis of" used in the present disclosure does not indicate "only on the basis of" unless explicitly stated otherwise. In other words, the expression "on the basis of" indicates both of "only on the basis of" and "at least on the basis of".

Any reference to the elements using the addresses "first", "second", and the like used in the present disclosure does not generally limit the amount or the order of the elements. Such addresses can be used in the present disclosure as a convenient method for distinguishing two or more elements. Therefore, the reference to the first and second elements does not indicate that only two elements can be adopted or the first element necessarily precedes the second element in any way.

In the present disclosure, in a case where "include", "including", and variations thereof are used, such terms are intended to be inclusive as with the term "comprising". Further, the term "or" used in the present disclosure is intended not to be exclusive OR.

In the present disclosure, for example, in a case where articles are added by translation, such as a, an, and the in English, the present disclosure may include that the nouns following such articles are in a plural form.

In the present disclosure, the term "A and B are different" may indicate that "A and B are different from each other". Note that, the term may indicate that "each of A and B is different from C". The terms "separated", "coupled", and the like may be construed as with "different".

REFERENCE SIGNS LIST

1: virtual space presentation system, 10: virtual space presentation device, 11: acquisition unit, 12: virtual space generation unit, 13: display control unit, 14: detection unit, 15: virtual space correction unit, 16: display correction unit, 20: content server, 21: storage unit, 22: transmitting unit, 30: HMD, 31: display unit, 32: motion detection unit, 50: virtual space, 50a: spherical surface, 51: virtual viewpoint, 61, 62, 63, 64, 65: content, 61a, 62a, 63a, 64a, 65a: display surface, P1, P2, P3, P4: position.

The invention claimed is:

1. A virtual space presentation device, comprising:
a virtual space generation unit generating a virtual space including a virtual viewpoint of a user inside to allocate a content into the virtual space;
a display control unit displaying the virtual space on a display unit;
a detection unit detecting an action of the user set in advance to determine a movement amount of the virtual viewpoint according to the action;
a virtual space correction unit moving the virtual viewpoint in the virtual space on the basis of the movement amount of the virtual viewpoint determined by the detection unit to correct the virtual space to a state seen from the moved virtual viewpoint; and
a display correction unit displaying the corrected virtual space on the display unit,
wherein a first size applied to the content when the virtual viewpoint is positioned at the center of the virtual space, and a second size different from the first size are associated with the content, and
the virtual space correction unit computes a display magnification of the content on the basis of the moved virtual viewpoint, and the first size and the second size associated with the content, and allocates the content to which a size according to the computed display magnification is applied to the corrected virtual space.

2. The virtual space presentation device according to claim 1,
wherein when a distance between the moved virtual viewpoint and the content is inside a predetermined threshold value, the virtual space correction unit allocates the content to which the second size is applied to the corrected virtual space.

3. The virtual space presentation device according to claim 2,
wherein when the distance between the moved virtual viewpoint and the content is outside the predetermined threshold value, the virtual space correction unit computes the display magnification for each movement of the virtual viewpoint on the basis of the moved virtual viewpoint, and the first size and the second size associated with the content.

4. The virtual space presentation device according to claim 2,
wherein when the distance between the moved virtual viewpoint and the content is outside the predetermined threshold value, the virtual space correction unit fixes a size of the content to the first size.

5. The virtual space presentation device according to claim 2,
wherein the virtual space generation unit generates a spherical virtual space with the virtual viewpoint in an initial state as the center.

6. The virtual space presentation device according to claim 1,
wherein when a distance between the moved virtual viewpoint and the content is outside a predetermined threshold value, the virtual space correction unit computes the display magnification for each movement of the virtual viewpoint on the basis of the moved virtual viewpoint, and the first size and the second size associated with the content.

7. The virtual space presentation device according to claim 6,
wherein the virtual space generation unit generates a spherical virtual space with the virtual viewpoint in an initial state as the center.

8. The virtual space presentation device according to claim 1,
wherein when a distance between the moved virtual viewpoint and the content is outside a predetermined threshold value, the virtual space correction unit fixes a size of the content to the first size.

9. The virtual space presentation device according to claim 8,
wherein the virtual space generation unit generates a spherical virtual space with the virtual viewpoint in an initial state as the center.

10. The virtual space presentation device according to claim 1,
wherein the virtual space generation unit generates a spherical virtual space with the virtual viewpoint in an initial state as the center.

11. The virtual space presentation device according to claim 10, wherein the display control unit allocates the content along a spherical surface of the virtual space.

* * * * *